United States Patent [19]
Dressen et al.

[11] Patent Number: 5,842,575
[45] Date of Patent: *Dec. 1, 1998

[54] DISK PACKAGE FOR ROTATING MEMORY DISKS

[75] Inventors: Larry G. Dressen; Lynn R. Zupan, both of Waconia, Minn.

[73] Assignee: Empak, Inc., Waconia, Minn.

[*] Notice: The portion of the term of this patent subsequent to Jan. 6, 2017, has been disclaimed.

[21] Appl. No.: 919,858

[22] Filed: Aug. 28, 1997

Related U.S. Application Data

[63] Continuation-in-part of Ser. No. 778,977, Jan. 6, 1997, Pat. No. 5,775,508.

[51] Int. Cl.⁶ .................................................. B65D 85/48
[52] U.S. Cl. ......................... 206/711; 206/454; 206/508
[58] Field of Search .................................. 206/454, 508, 206/711; D9/341, 424, 431, 432

[56] References Cited

U.S. PATENT DOCUMENTS

| | | |
|---|---|---|
| D. 344,891 | 3/1994 | Dressen .................................. D9/424 |
| 4,061,228 | 12/1977 | Johnson . |
| 4,248,346 | 2/1981 | Johnson . |
| 4,450,960 | 5/1984 | Johnson . |
| 4,793,488 | 12/1988 | Mortensen . |
| 4,817,795 | 4/1989 | Kos ..................................... 206/454 X |
| 4,817,799 | 4/1989 | Gregerson et al. . |
| 4,880,116 | 11/1989 | Kos ......................................... 206/454 |
| 4,966,284 | 10/1990 | Gregerson et al. . |
| 5,025,926 | 6/1991 | Gregerson et al. . |
| 5,207,324 | 5/1993 | Kos . |
| 5,255,543 | 10/1993 | Wittman . |
| 5,273,159 | 12/1993 | Gregerson . |
| 5,390,811 | 2/1995 | Ogino et al. ......................... 206/711 X |
| 5,555,981 | 9/1996 | Gregerson . |

*Primary Examiner*—Bryon P. Gehman
*Attorney, Agent, or Firm*—Haugen and Nikolai, P.A.

[57] ABSTRACT

A package for storing and shipping memory disks is disclosed. The package includes a base and cover designed to enclose and seal a plurality of disks held in a cassette. The base and cover include reinforcing gussets and members for securely retaining the cassette and disks so that the disks do not tilt, rattle or otherwise move during transport.

21 Claims, 14 Drawing Sheets

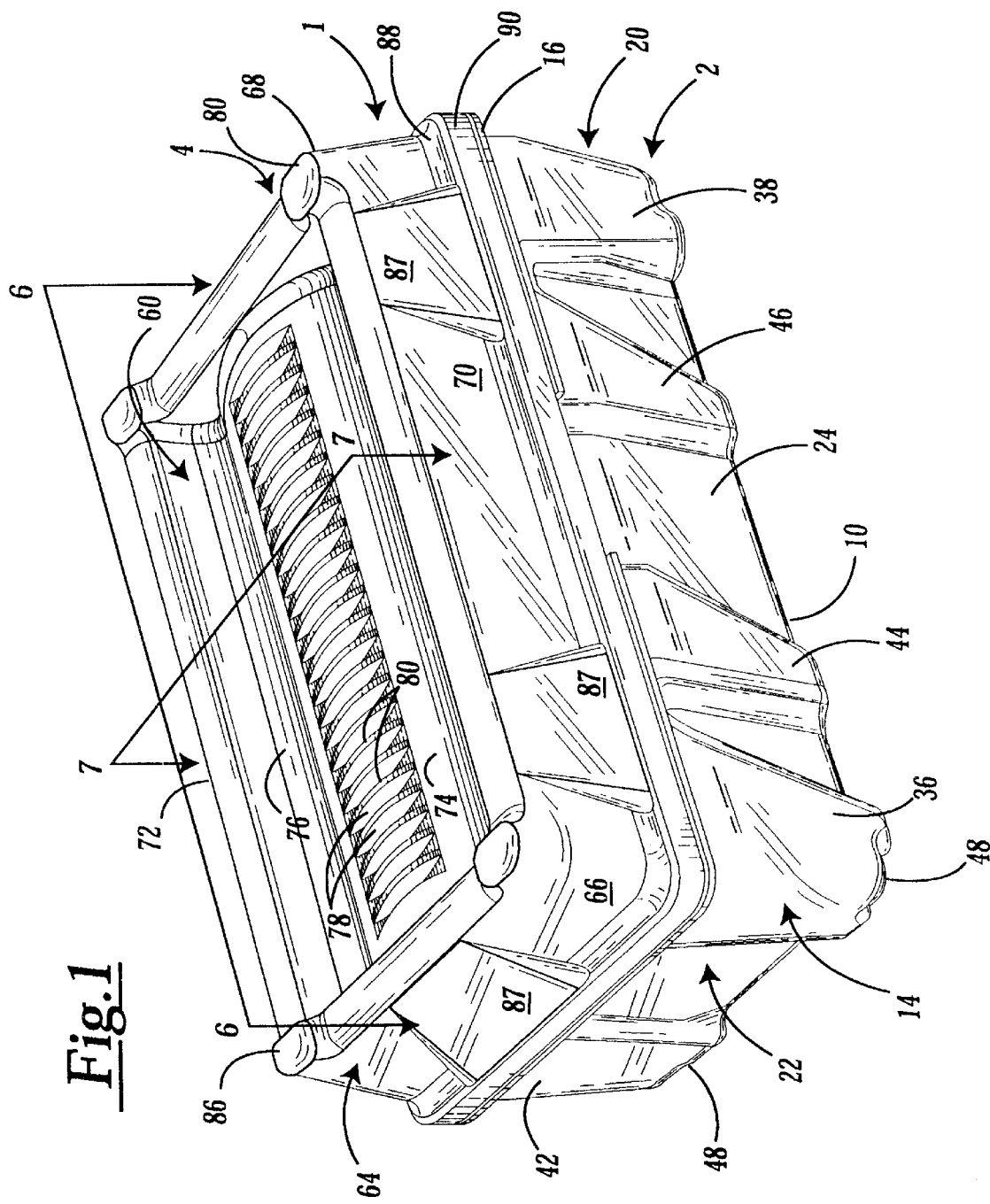

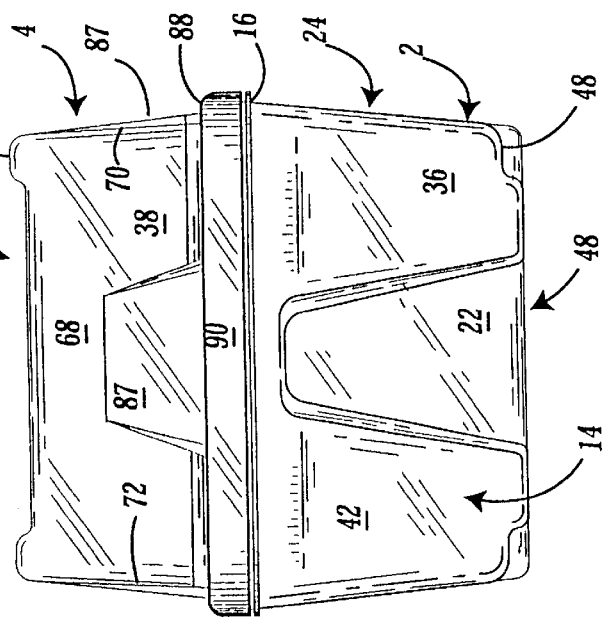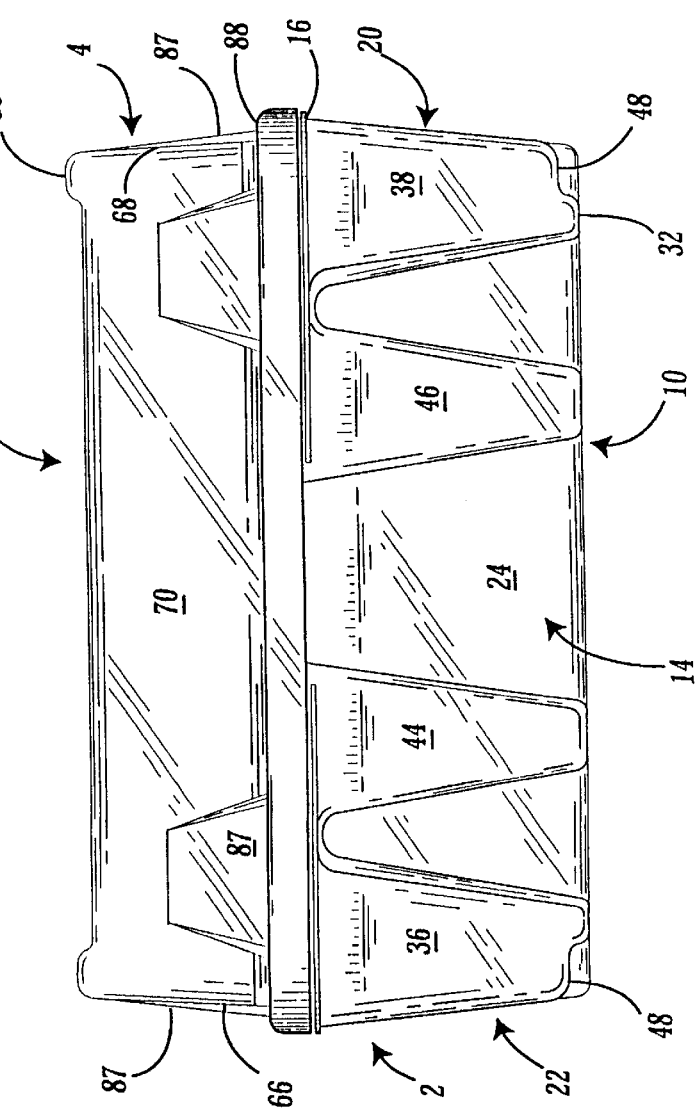

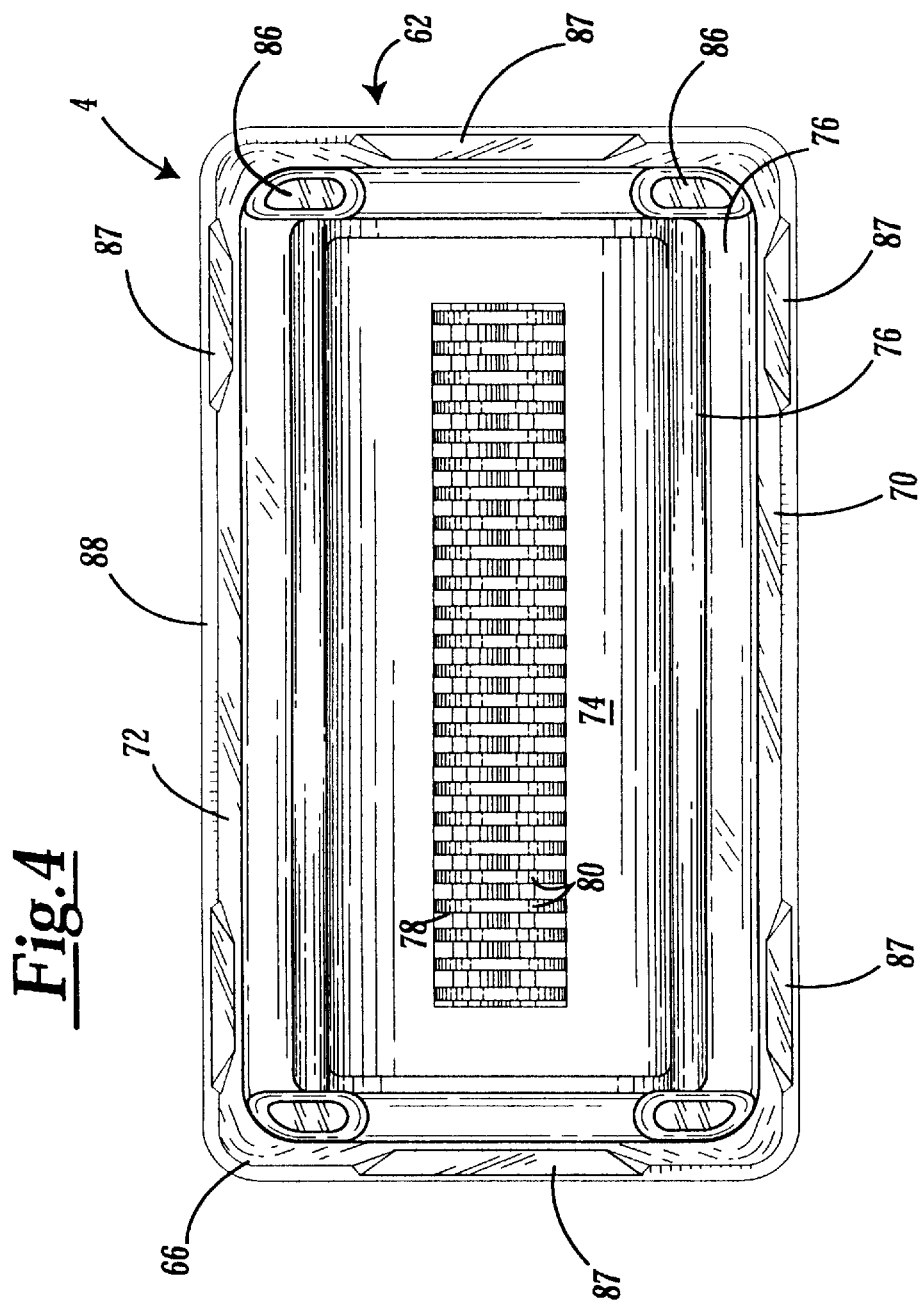

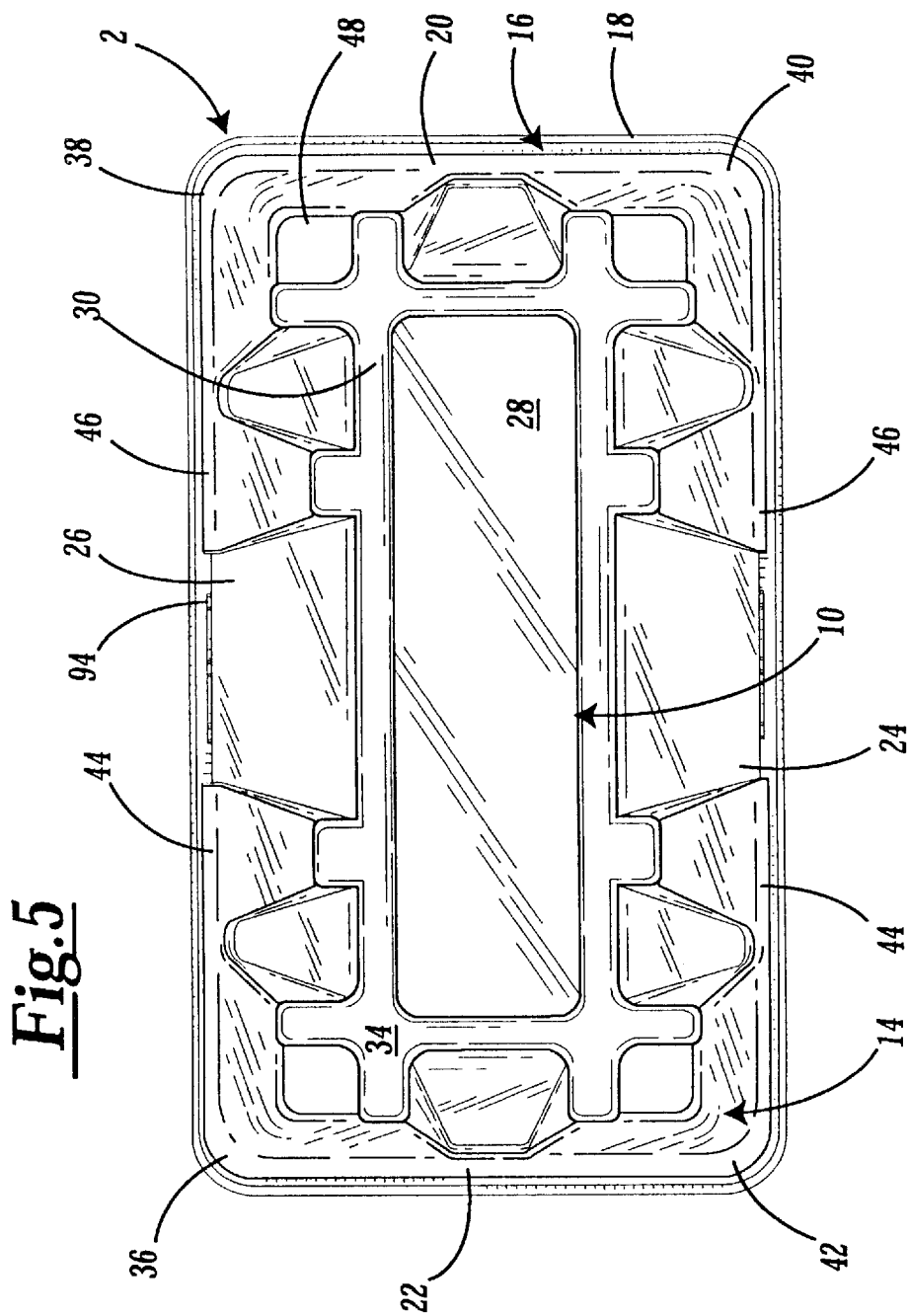

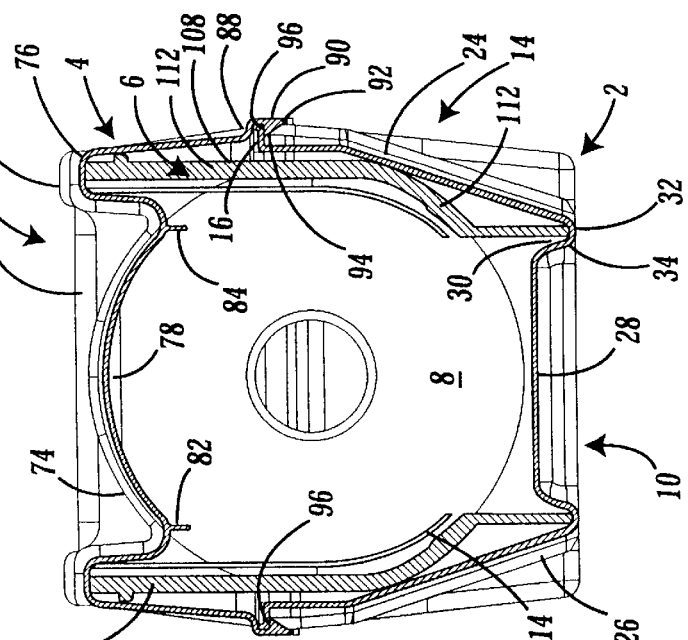
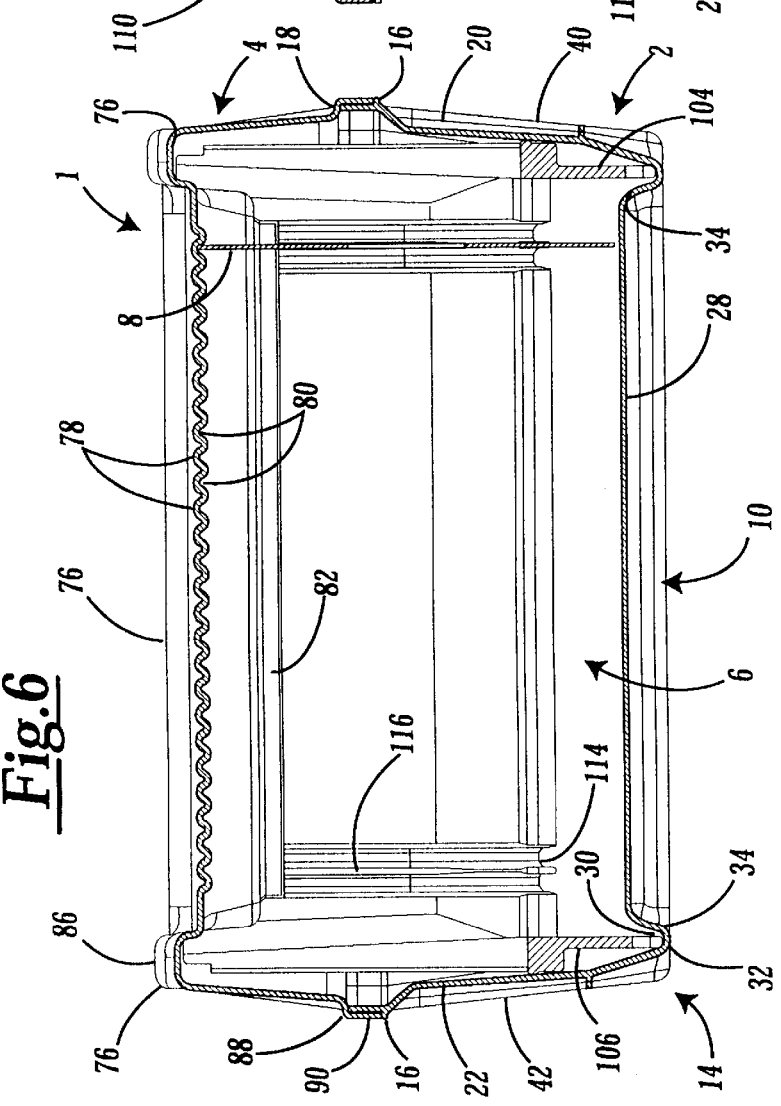

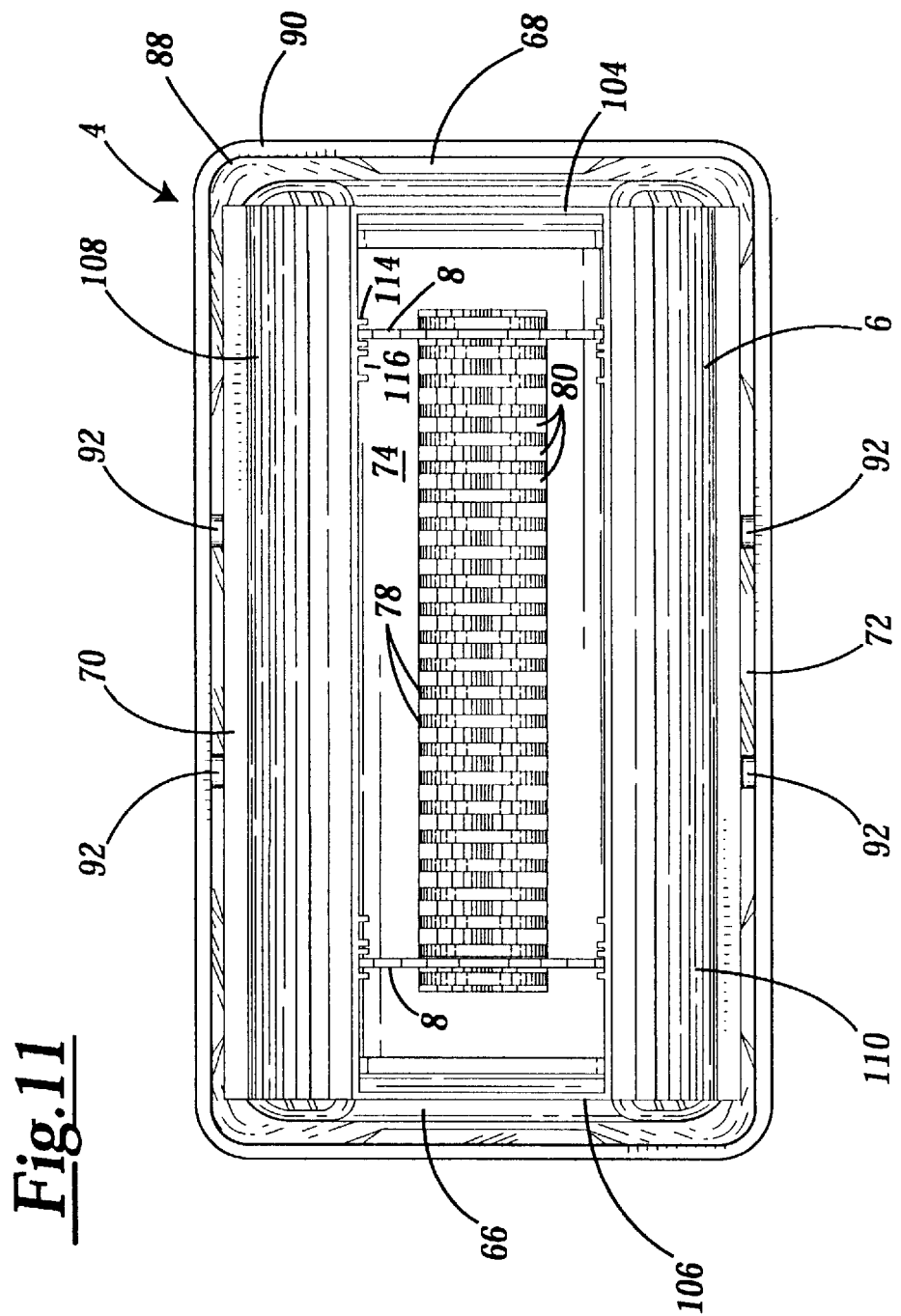

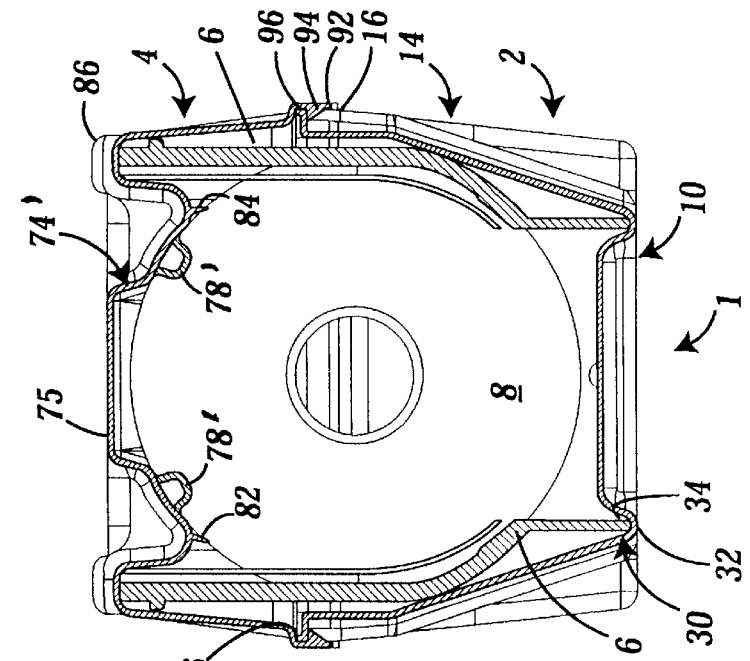
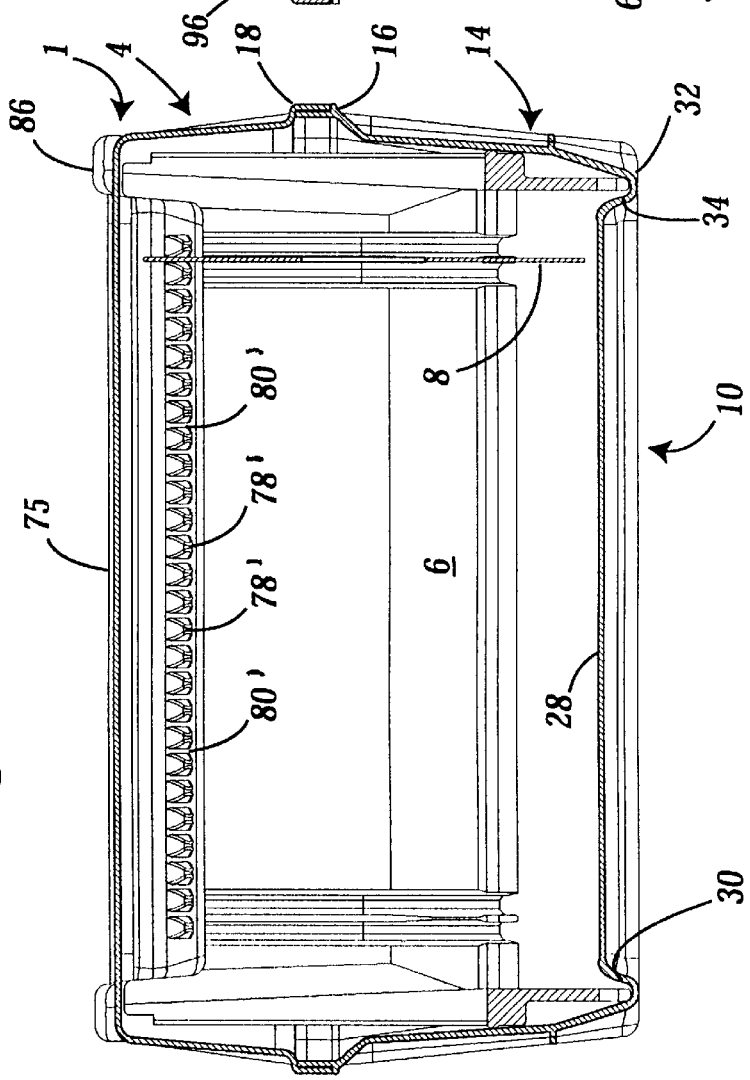

DISK PACKAGE FOR ROTATING MEMORY DISKS

This is a continuation-in-part of application Ser. No. 08/778,977, filed Jan. 6, 1997, entitled "IMPROVED DISK PACKAGE FOR ROTATING MEMORY DISKS," now U.S. Pat. No. 5,775,508 the teachings of which are hereby incorporated by reference.

BACKGROUND OF INVENTION

Field of Invention

The present invention relates generally to packaging used for large capacity, magnetic disk storage products. More specifically, the present invention relates to an improved package for storing and transporting flat circular disks used for storage of digital information in computer disk drives.

The disks used to store digital information are very fragile. Such disks can be easily scratched or warped. When such disks are scratched or warped, their usefulness in reliably storing and playing back information is destroyed.

Any number of factors can contribute to scratching, warping, or denting of the memory disks. The disks can rub against each other or contact other items during manufacturing and thereby damage the surface which must remain perfectly flat for proper operations in a hard disk drive system. Disks can be damaged by the very equipment used to process them into rotating memory platters. Such disks can also be damaged by process carriers and packaging used to store and transport the disks during manufacture. Finally, the disks can be damaged and contaminated by particles generated by movement of the disks within a disk package.

The principal object of the present invention is to provide an improved package which securely holds a plurality of disks to substantially reduce scratching and damage thereof. This objective is achieved by the present invention in several ways.

First, the package of the present invention is designed to not only hold the disks, but also to hold a shipping cassette in which the disks are held. This arrangement reduces the number of times the disks need be transferred from one holder to another during successive processing steps, and thus reduces damaging likely to occur during repeated insertion and removal of the disks from their holders.

Second, the top and bottom members of the disk package of the present invention are self-aligning, providing a telescoping fit. This self-aligning, telescoping fit protects the disks from damage which might otherwise be caused by misalignment as the top and bottom members are assembled together after being filled with the memory disks.

Third, the top cover may be provided with locators which keep the disks from contacting one another, and may be provided with cushions which prevent movement or rattling of the disks within the package.

Fourth, all latches used in the design are on the outside of the package. This prevents any minute particles created by engaging or disengaging the latch from contaminating the interior of the package where such particles could adhere to or scratch the disks.

Fifth, the outside walls of the package are gusseted for strength. This reduces flexing of the walls and any resulting generation of contaminating particles or inadvertent contact of the disks with one another. The walls of the package are also designed to retain the disk cassette in proper alignment and are configured to cooperate with the cassette to increase the overall strength of the walls.

Sixth, the base and cover of the package are designed so that several such disk containing packages can be easily stacked one on top of the other. Packages can also be easily removed from a stack without causing disks in the package to move in relation to the components of the package and be thereby scratched or warped.

The advantages of the present invention and how they are achieved will become more clear from a reading of the following detailed description, in conjunction with the accompanying drawings and the appended claims, all of which form this specification.

BRIEF DESCRIPTION OF THE DRAWINGS

FIG. 1 is a perspective view of the improved disk package with the base and cover in the closed position;

FIG. 2 is an elevational view of one of the longer sides of the improved disk package, the opposite side being the mirror image thereof;

FIG. 3 is an elevational view of one of the shorter sides of the improved disk package, the opposite side being the mirror image thereof;

FIG. 4 is a top plan view of the cover of the improved disk package;

FIG. 5 is a bottom plan view of the base of the improved disk package;

FIG. 6 is a cross-section through line 6—6 in FIG. 1;

FIG. 7 is a cross section through line 7—7 in FIG. 1;

FIG. 11 is a view of the inside of the cover;

FIG. 14 shows a cross-section through line 14—14 in FIG. 13.

FIG. 15 shows a cross-section through line 15—15 in FIG. 13.

DETAILED DESCRIPTION OF THE PREFERRED EMBODIMENT

Figure 9:
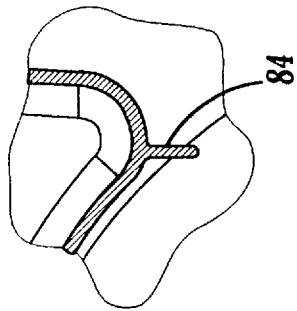
FIG. 9 is a cross-sectional view showing one of the cushions used to keep the disks from rattling or tilting within the disk package.
Figure 10:
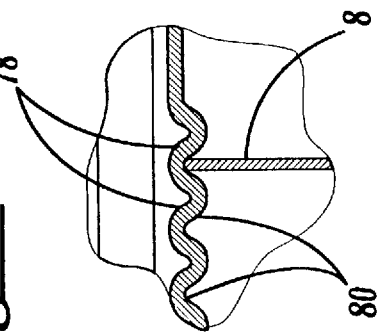
FIG. 10 is a cross-sectional view showing how a disk is received within a slot defined by the teeth of the cover.
Figure 8:
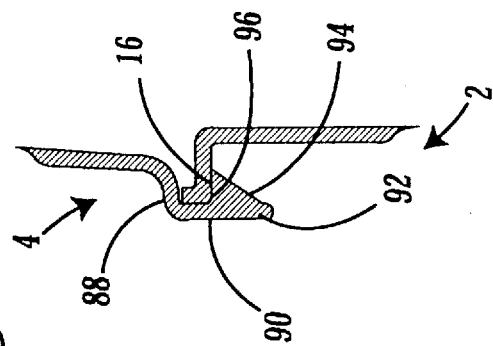
FIG. 8 is an enlarged view showing the arrangement for latching the base to the cover.
Figure 12:
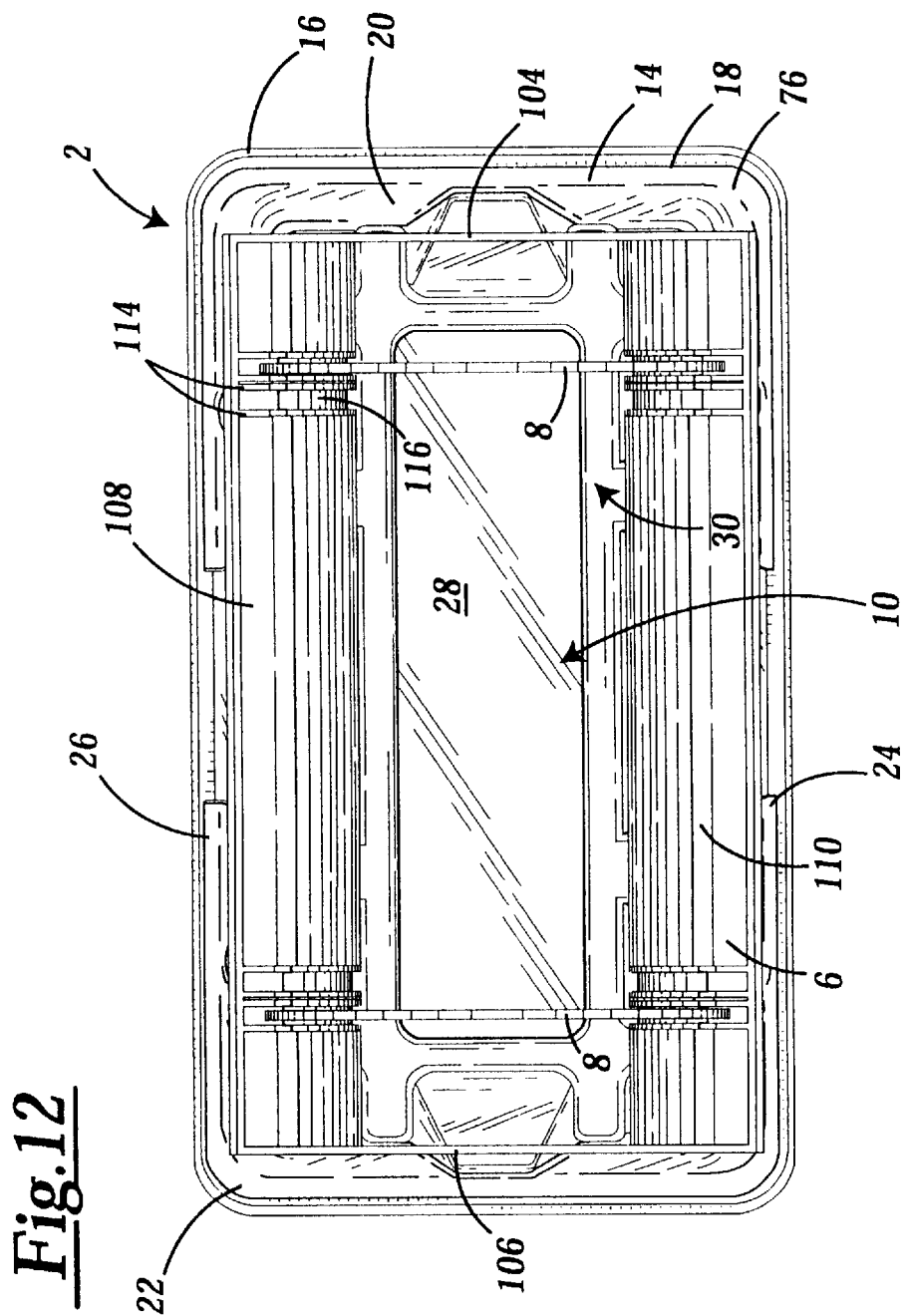
FIG. 12 is a view of the inside of the base.
Figure 13:
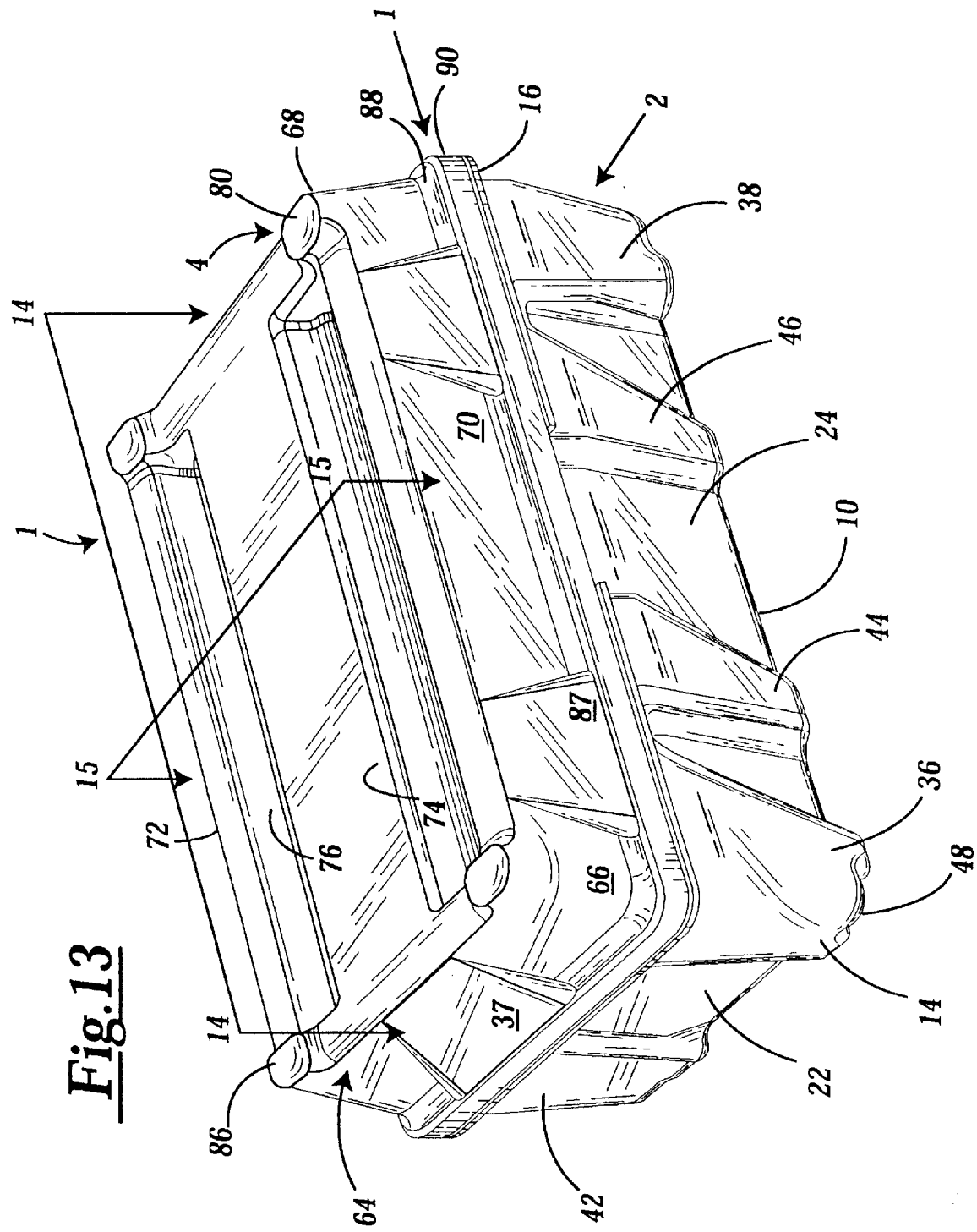
FIG. 13 is a perspective view of an alternative embodiment of the improved disk package.
Figure 16:
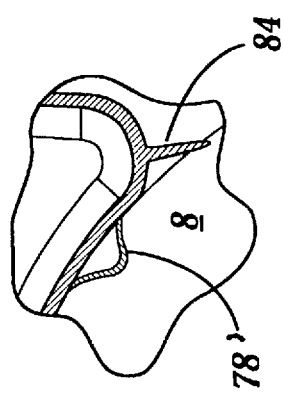
FIG. 16 is an enlarged view of a portion of FIG. 15 showing how the teeth and cushions of the alternative embodiment engage the disks.
Figure 17:
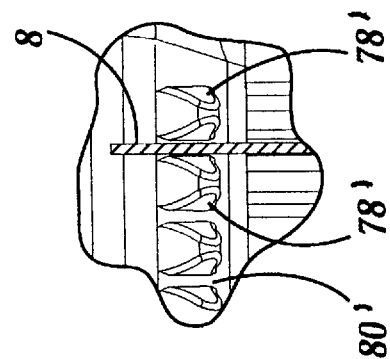
FIG. 17 is an enlarged view of a portion of FIG. 14 showing how the teeth and slots of the alternative embodiment cooperate to receive and hold the disks.

The disk package 1 of the present invention includes a base 2 and a cover 4. The base 2 and cover 4 are specifically designed to hold and protect a disk cassette 6 (shown in FIGS. 6, 7, 11, 12, 14, 15, 18 and 19) and a plurality of magnetic memory disks 8 disposed in the cassette. The cover 4 is removable from the base 2 to permit easy insertion and removal of the cassette 6 and disks 8. The cassette 6 and disks 8 are typically inserted into and removed as a unit from base 2.

Base 2 will now be described in detail. As shown in FIGS. 1, 5, 12 and 21, the base 2 has a closed bottom 10, an open top (FIG. 12), a continuous side wall 14 projecting up from the closed bottom 10, and a continuous rim 16 projecting horizontally outward from the side wall 14 near the top 18 of side wall 14. The base 2 has two opposing shorter sides 20 and 22 and two opposing longer sides 24 and 26. The closed bottom 10 has raised center section 28 (FIG. 7) surrounded by a depression or channel 30 of generally U-shaped cross-sections. The outer surface 32 of channel 30 can be used to support the base 2 on a flat work surface. The channel 30 is also designed to receive the bottom legs of cassette 6 and thereby supports cassette 6 on inner surface 34 of channel 30.

As indicated above, the continuous side wall 14 shown in FIG. 1 extends upward from the outside edge of the bottom 10. The continuous side wall 14 includes four corner gussets 36, 38, 40 and 42 (FIGS. 2, 3 and 5). Two additional gussets 44 and 46 are located on each of the portions of wall 14 running along the longer sides 24 and 26 of the base 2. This arrangement of gussets 36–46 greatly increases the strength of base 2. Also, to promote easy stacking and unstacking of disk packages made in accordance with the present invention, each corner gusset 36–42 has a pad 48 in its bottom for stacking one disk package of the present invention on top of another.

Figure 21:
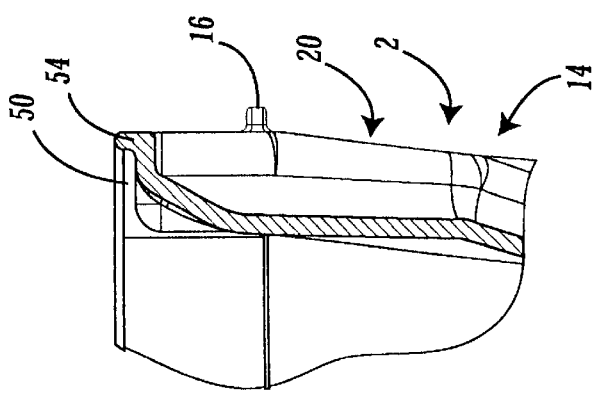
FIG. 21 is a cross-section through line 21—21 in FIG. 20.
Figure 20:
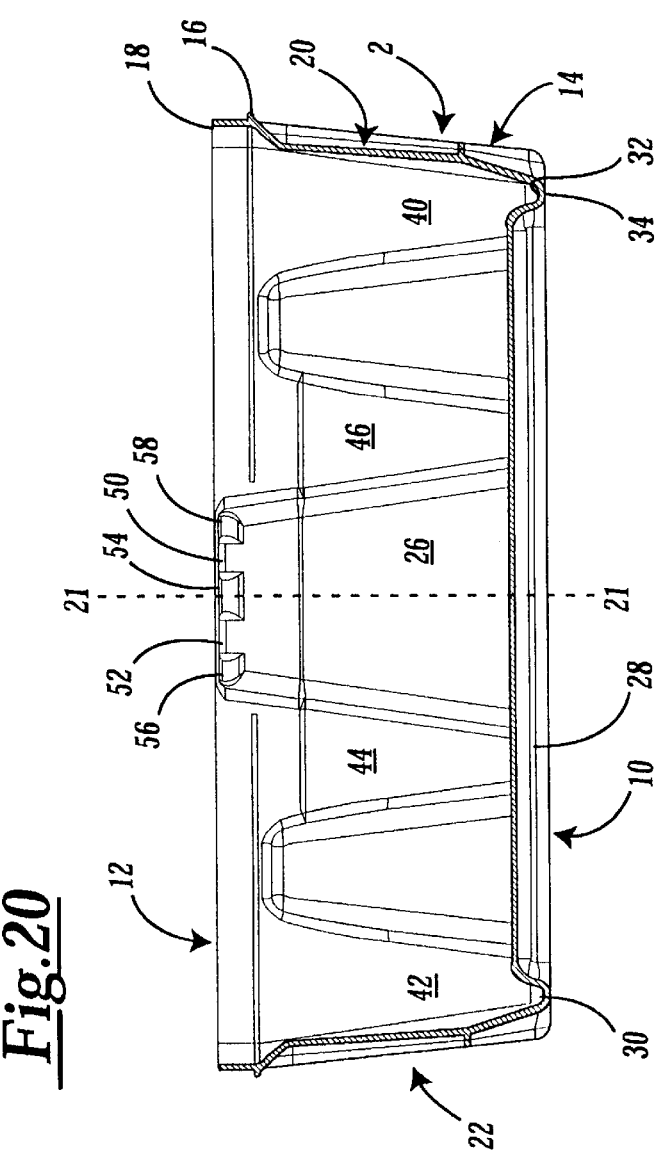
FIG. 20 is a cross-sectional view like that of FIG. 6 with the cover and cassette removed to show the inside of the side wall of the base.
Figure 22:
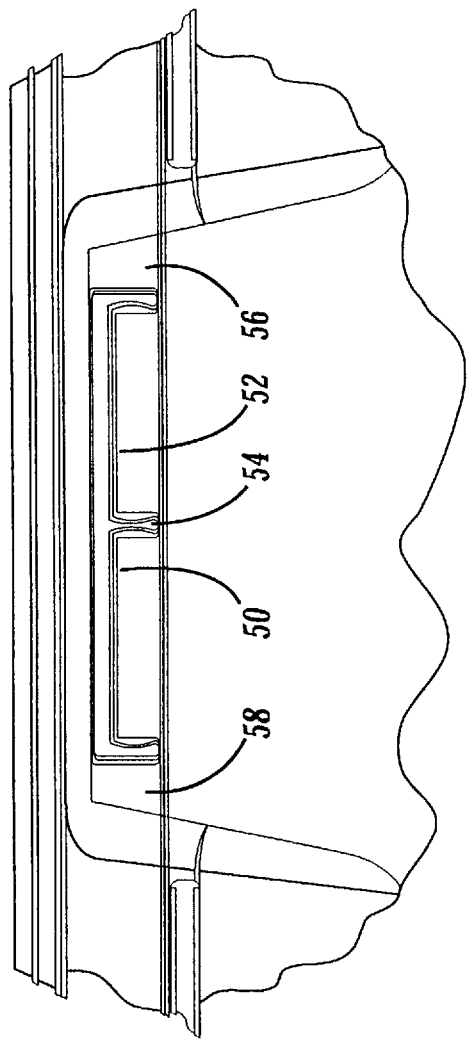
FIG. 22 is a partial view of the exterior of the base showing the components on the base which cooperate with components on the cover to latch the cover to the base.

Additional detail related to the structure of the base 2 is provided in FIGS. 20–22. These Figures are included to specifically explain the position and structure of the latching components of the base 2.

As indicated above, memory disks can be damaged by loose particles in the storage chamber of a shipping container. One way that such particles can be generated is by the rubbing action of latching components. An important feature of the present invention is the location of all surfaces which rub together during latching of the base 2 and cover 4 outside the disk storage chamber. This feature prevents any particles generated during the latching or unlatching operation from entering the storage chamber where they can cause damage.

As shown in FIGS. 20–22, the base 2 includes two outwardly projecting ledge members 50 and 52. Also shown are a center support member 54 and a pair of outer supports 56 and 58. Supports 54, 56 and 58 prevent the ledge members from flexing. They also ensure proper alignment between the ledge members 50 and 52 and the latching members of the cover as described in greater detail below.

The cover 4 of the present invention has a closed top 60, an open bottom 62, and a continuous side wall 64 projecting downward from the top 60. The cover 4 has two opposing shorter sides 66 and 68 and two opposing longer sides 70 and 72. The top 60 of cover 4 has a center section 74 surrounded by a channel 76. Center section 74 has an arch-shaped configuration. At the top of arch-shaped center section 74 are a plurality of tooth-like locators 78 which define disk receiving slots 80. When cover 4 is in the closed position, the top edges of each disk 8 is located within a separate slot 80 between adjacent teeth 78. The teeth 78 serve to hold the top edges of the disks 8 apart and prevent tilting within the disk package 1. Projecting downward from opposite sides of the arch-shaped center section 74 are longitudinally extending cushions 82 and 84. When the cover 4 is in the closed position, cushions 82 and 84 engage the edges of the disks 8 preventing the disks from moving freely and rattling.

As noted above, the disk package 1 is intended to be used with a disk cassette 6. When a cassette 6, loaded with disks 8, is in place in the base 2 and the cover 4 is in the closed position, the top edges of the cassette 6 are received and held in the channel 76 of the cover 4 in a manner similar to the way the bottom edges of cassette 6 are received and held in the channel 30 of the base 2.

Top 60 of cover 4 includes four raised platforms 86 at the corners. These raised platforms 86 are used in stacking the disk packages 1. More specifically, when the disk packages are stacked, the four pads 48 on the base 2 of one package 1 engage the four platforms 86 on the cover of another package 1 to support one of the packages above the other.

The continuous side wall 64 of cover 4 shown in FIG. 1 will now be described. The side wall 64 projects downward from the channel 76 of the cover 4. The side wall has two gussets 87 on each of the longer sides 70 and 72 and one gusset 87 along each of the shorter sides 66 and 68. This arrangement significantly increases the strength and durability of the cover 4. Near the bottom of the side wall 64 is an outwardly projecting ledge 88. Projecting downward from the outer edge of ledge 88 is a ramp surface 90. Projecting inward from surface 90 along each of sides 70 and 72 are a pair of barbs or latches 92 which are used to selectively hold the cover 4 in the closed position with respect to the base 2. The barb-shaped latches 92 each have a ramped surface 94 and a catch surface 96.

When one wishes to close the disk package 1, the cover 4 is placed over the base 2. More particularly, the surface 90 is positioned to telescope over the portion of side wall 14 of base 2 above rim 16. As these parts are pushed together, the ramped surfaces 94 engage ledge members 50 and 52 and the latches 92 are pushed outward relative to the base 2 until the catch surfaces 96 reach the ledge members 50 and 52. The latches 92 then snap back, capturing ledge members 50 and 52 with the barbed catch surfaces 96 to hold the base 2 and cover 4 together. The cover 4 can be removed from the base 2 by pulling out on the side wall of the cover 4 near the latches 92 until the latch surfaces 96 no longer engage the ledge members 50 and 52 and then lifting the cover 4 off the base 2. The supports 54, 56 and 58 ensure proper alignment of the ledge members 50 and 52 and barbed catch surfaces 96.

Two alternative embodiments having different covers 4 are shown in FIGS. 13 through 17. From the outside, both of these alternative embodiments have the same appearance shown in FIG. 13. The cover 4 of these embodiments differs from the embodiment shown in FIG. 1 in several respects. First, the center arch-shaped section 74 of the cover 4 is replaced by a raised section 74' with a flat top 75. Second, the teeth 78 and slots 80 on the arch-shaped center section 74 of the embodiments shown in FIG. 1 have been eliminated. In the case of the alternative embodiment shown in FIGS. 14 through 17, two rows comprising teeth 78' and slots 80' extend into the package from the longer sides of the channel 76. The two rows are parallel to each other. The teeth 78' and slots 80' in one row oppose and are aligned with the teeth 78' and slots 80' in the other row. Thus, when the package is closed, a pair of slots 80' (one in each row) hold the disks 8 apart to prevent tilting within the disk package 1.

Figure 19:
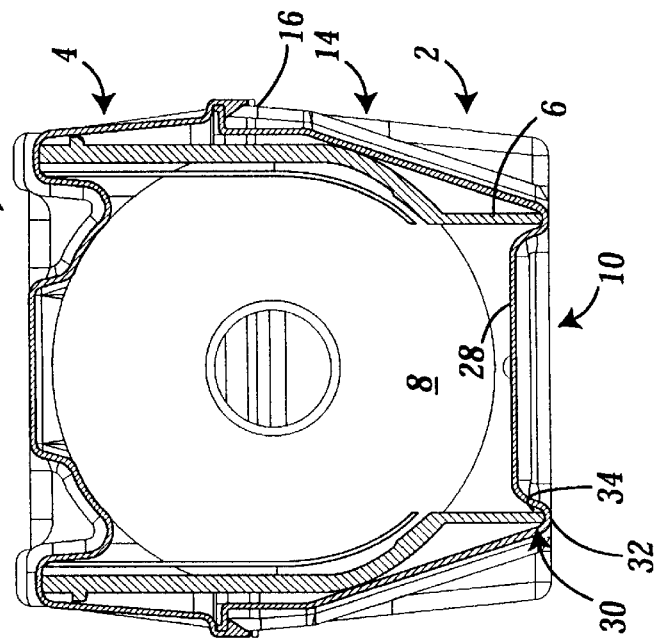
FIG. 19 is a cross-sectional view, similar to FIG. 15, showing the interior of a package made in accordance with a second alternative embodiment.
Figure 18:
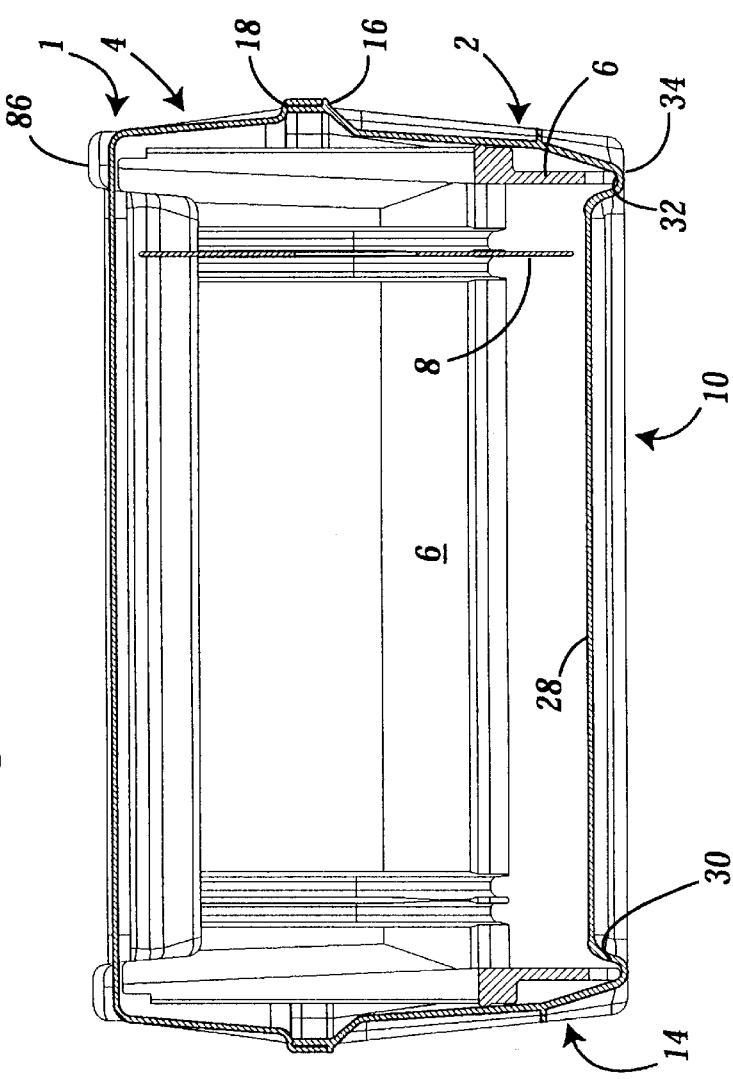
FIG. 18 is a cross-sectional view, similar to FIG. 14, showing the interior of a package made in accordance with a second alternative embodiment.

In the embodiment showing in FIGS. 18 and 19, no teeth or slots are present in the cover. The disks are held apart either exclusively by teeth and slots in a separate cassette 6 or by the combination of the teeth and slots in cassette 6 and contact of the channel 76 with the edges of the disks.

As indicated above, the disk package 1 of the present invention incorporates a cassette 6 which holds a set of disks 8 so that the disks need not be individually transferred to a different transport package for each manufacturing operation. As shown, for example, in FIGS. 6 and 7, the cassette 6 will typically have an open top for insertion and removal of disks 8 therefrom. The bottom is also typically open. The cassette 6 has a pair of end walls 104 and 106 and a pair of side walls 108 and 110. The side walls 108 and 110 typically have surfaces 112 for supporting the disks 8 and a set of teeth 114 forming slots 116 which hold the disks 8 in a spaced apart, parallel relationship to each other. As indicated above, the bottoms of cassette walls 104, 106, 108 and 110 are intended to be received and held by channel 30 of base 2. Likewise, the top portions of cassette walls 104, 106, 108 and 110 are positioned in and held by channel 76 of cover 4 when the cover is in the closed position.

It can be seen that the cooperation between the top 4 and base 2 with the disk cassette 6, and with the peripheral edges of the disks contained within the cassette, positively hold the disks in a vertical upright position, preventing any scratching or marring thereof. They also provide a sealed, dust-proof environment during storage such that the disks will be in pristine undamaged condition at the time they are to be assembled as a hard disk drive in a computer.

From the foregoing description and a review of the drawings, various advantages of the subject invention should be understood. For example, the position and design of latches 92 reduces the chance of particle generation during a latching operation. The position location and design of latches 92 also reduce the potential that particles generated during the latching process will find their way into the disk package 1 and into contact with a surface of the disk stored therein.

From a review of the drawings, one can also note that the latches 92 do not protrude past the perimeter of the cover 4. Thus, the disk package I can be placed upon conveyors for transport without fear that the latches 92 will catch on adjacent equipment.

Also, as should now be clear, the base 2 and cover 4 completely encapsulate the cassette 6. These components are all designed to be self-aligning as they are assembled. Thus, the risk of particle adherence from a secondary package is reduced as is the risk of particle generation due to abrasion between the base 2, cover 4 and cassette 6.

From a review of the foregoing, those skilled in the art will recognize that disk packages made in accordance with the present invention offers many additional advantages. These include: (1) gussetted side walls for structural strength; (2) outside bottom and top surfaces designed to allow disk packages made in accordance with the present invention to be safety stacked; (3) surfaces designed to minimize water entrapment during cleaning; and (4) a footprint compatible with existing equipment in the industry. The capacity and pitch of disk package 1 maintains industry's standards of 25 and ¼ inch respectively. The footprint also allows users to continue to use pre-existing secondary packaging. The design of base 2 captures the disks in a way that minimizes disk movement and particle generation. The cover 4 is designed so that it only contacts the outside diameter of the disks again reducing damage to the disks.

The cassette 6 cooperates with the base 2 and cover 4 to improve the structural strength of the disk package.

Further, the design of the teeth 114 and 78 slots 116 and 80 are configured to provide a parallel alignment of the disks perpendicular to a central axis through the disks with minimum axial movement of the disks. The reduced height of the teeth 114 and 78 minimizes the risk of abrasion between the disks and the disk package.

Finally, the configuration of the disk package 1 may place the center of gravity of disk package 1 sufficiently above closed bottom 10 such that disk package 1 will be forced to consistently rest in a stable fashion on either cover 4 (on one of two opposing longer sides 70 and 72) or base 2 (on one of two opposing longer sides 24 and 26) when rested on any one of its opposing longer sides 24, 26, 70 and 72. This strategic placement of the center of gravity of disk package 1, which may be above or below rim 16 to rest on cover 4 or base 2 respectively, allows disk package 1 to present its various surfaces at a consistent angle in relation to the resting surface when placed on any one of its opposing longer sides 24, 26, 70 and 72. This consistent presentation may assist automatic reading of indicia, such as a bar code, on disk package 1 or on the cassette 6 when the base 2 and cover 4 are made of a clear material such as polypropylene.

What is claimed is:

1. A storage and transport package for enclosing a plurality of disks of a predetermined diameter, each with a peripheral edge, contained in a cassette, said package comprising:

(a) a base including a closed bottom, an open top, a continuous side wall projecting from the closed bottom to the open top, said closed bottom including a center section surrounded by a channel for receiving and retaining a bottom portion of a cassette, said side wall including two pair of opposing sections, an outwardly projecting rim near the top of said side wall, four corner gussets, and at least one additional gusset on each section of at least one pair of opposing sections; and (b) a cover including a closed top, an open bottom, a continuous side wall projecting from the closed top to the open bottom, said closed top including a center section surrounded by a channel for receiving and retaining a top portion of a cassette, said continuous side wall of said cover having a plurality of outwardly projecting gussets, an outward projecting ledge, a surface projecting downwardly from said ledge, and means for latching said cover to said base.

2. The package of claim 1 wherein said means for latching said cover to said base includes a ramped surface and a catch surface.

3. The package of claim 2 wherein said catch surface engages said rim on said base to hold said base and cover together when the package is closed.

4. The package of claim 1 wherein the surface of the cover projecting downwardly from the ledge telescopes over the portion of the side wall of the base above the rim of the base so that when the package is closed, said surface surrounds the portion of the side wall of the base above said rim.

5. The package of claim 1 further including four pads for stacking on the base and four raised platforms for stacking on the cover.

6. The package of claim 1 wherein said center section of said cover has an arch shape.

7. The package of claim 5 wherein said means for latching said cover to said base do not project past the surface of the cover that projects downwardly from the ledge.

8. The package of claim 1 wherein said center section of said cover has a plurality of teeth which cooperate to form slots for holding apart a plurality of disks placed in said package, said teeth having first and second sides.

9. The package of claim 8 wherein said cover has a first cushion extending longitudinally along the first side of said teeth and a second cushion extending longitudinally along the second side of said teeth, said cushions engaging the peripheral edges of the disks when the cover is closed to reduce movement of the disks.

10. The package of claim 1 further including a plurality of teeth projecting from said cover to form pairs of aligned slots for holding apart a plurality of disks placed in said package.

11. The package of claim 10 wherein said aligned slots hold the disks in an alignment generally perpendicular with respect to a central axis through the disks with minimal axial movement of the disks.

12. The package of claim 1 wherein at least a portion of said base is made of a clear material so that indicia on objects contained therein can be seen through the base.

13. The package of claim 1 further including a cassette which cooperates with said base and cover to enhance the structural strength of the package.

14. The package of claim 1 further including a cassette which cooperates with said base and cover to retain a plurality of disks in a parallel alignment perpendicular to a central axis through the disks with minimal axial movement of the disks to minimize abrasion between the disks and the package.

15. The package of claim 1 wherein the continuous side wall of the base includes two opposing longer sides.

16. The package of claim 15 wherein the center of gravity of the package is such that the package can rest in a stable fashion on either section of at least one pair of opposing sections of the continuous side wall of the base as well as the closed bottom.

17. The package of claim 1 wherein the continuous side wall of the cover includes two opposing longer sides.

18. The package of claim 17 wherein the center of gravity of the package is such that the package can rest in a stable fashion on either section of at least one pair of opposing sections of the continuous side wall of the base as well as the closed top.

19. The package of either claim 16 or 18 made of a clear plastic material so that as the package rests in a stable fashion, indicia on the contents of the package can be automatically read.

20. The package of either claim 16 or 18 further including indicia located thereon that can automatically be read as the package rests in a stable fashion.

21. The package of claim 1 wherein at least a portion of said cover is made of a clear material so that indicia on objects contained therein can be seen through the cover.

* * * * *